May 17, 1927. 1,628,947
L. BUEHLER, JR., ET AL
COMBINED THAWING TANK AND DUMPING APPARATUS
Filed July 2, 1925   2 Sheets-Sheet 1
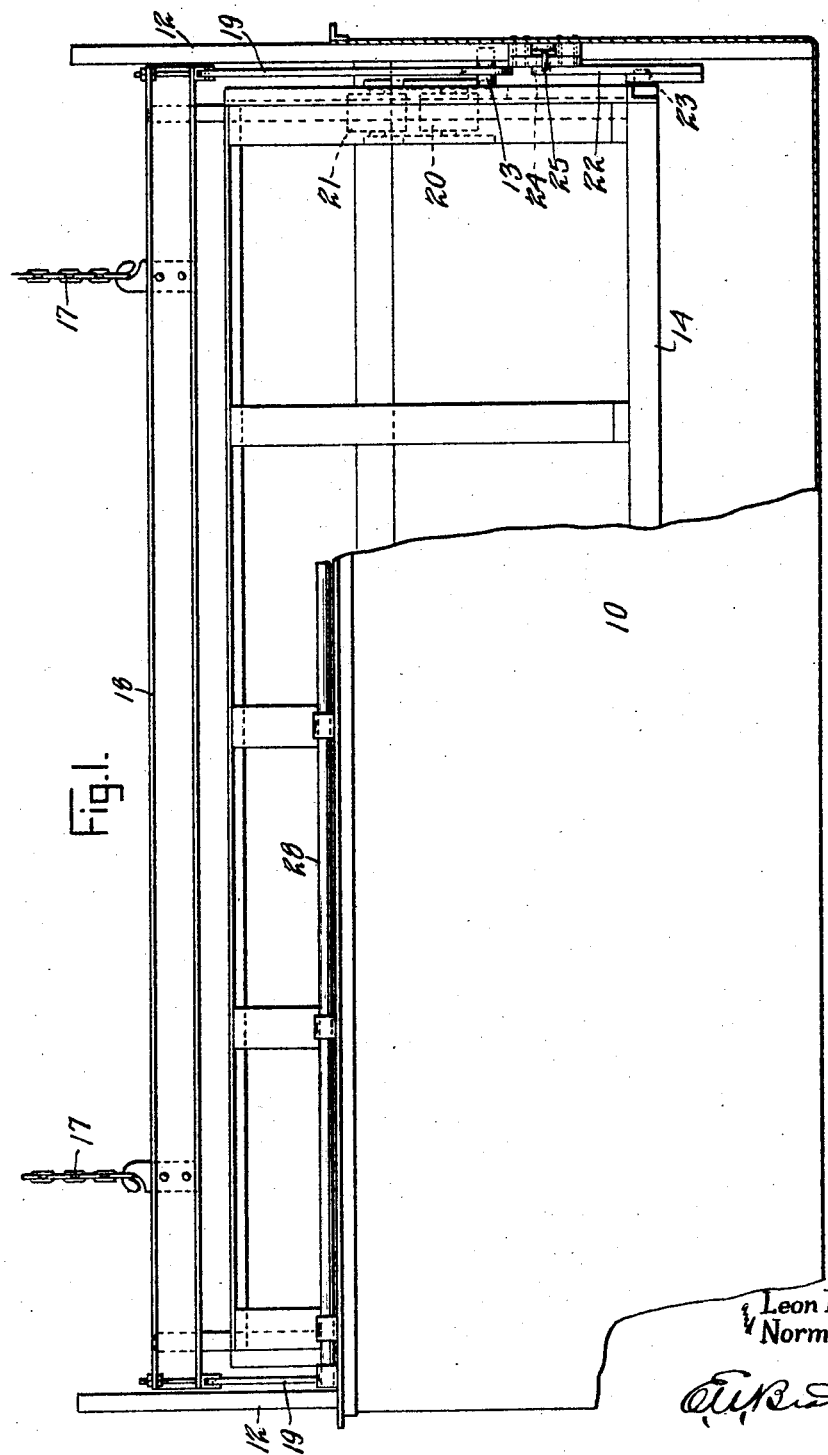
Inventors
Leon Buehler, Jr.
Norman M. Small
Attorney May 17, 1927.
L. BUEHLER, JR., ET AL
1,628,947
COMBINED THAWING TANK AND DUMPING APPARATUS
Filed July 2, 1925   2 Sheets-Sheet 2
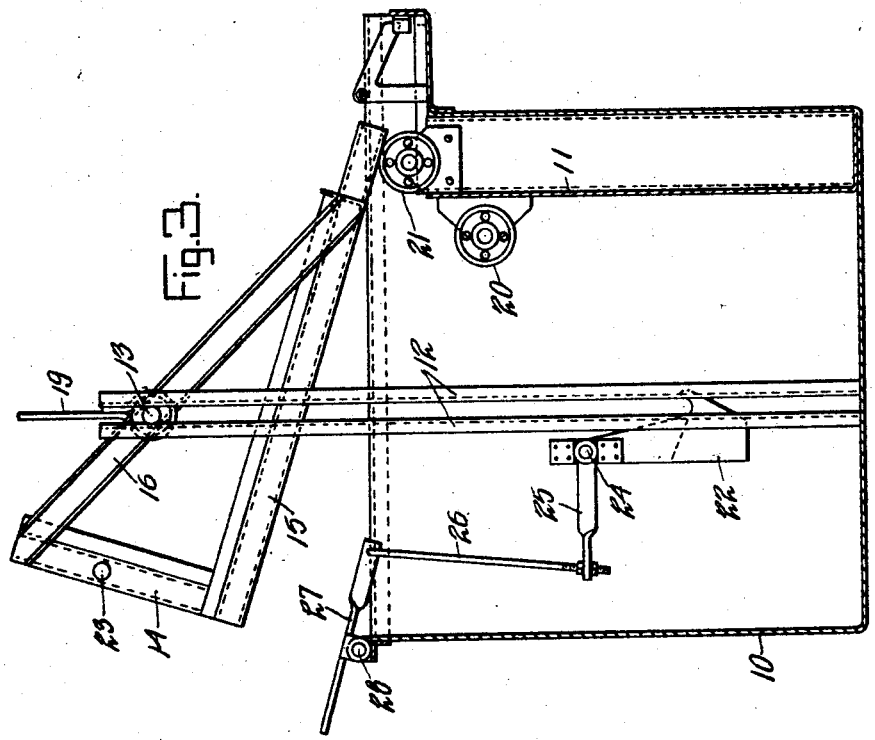
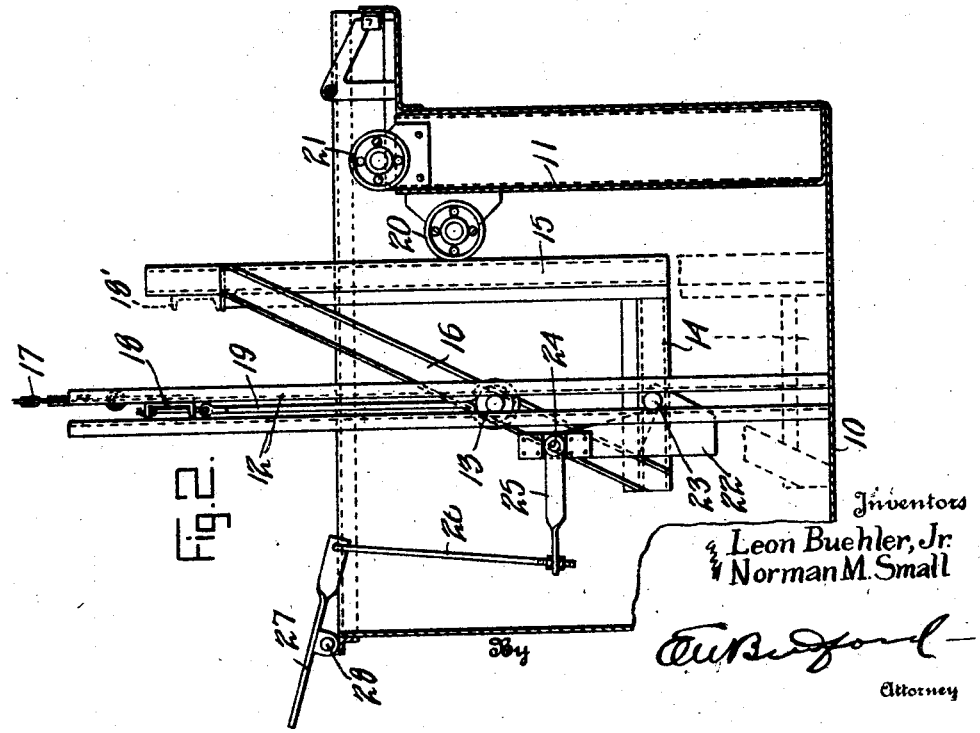
Inventors
Leon Buehler, Jr.
Norman M. Small
Attorney Patented May 17, 1927.

1,628,947

UNITED STATES PATENT OFFICE.

LEON BUEHLER, JR., AND NORMAN M. SMALL, OF WAYNESBORO, PENNSYLVANIA, ASSIGNORS TO FRICK COMPANY, OF WAYNESBORO, PENNSYLVANIA, A CORPORATION OF PENNSYLVANIA.

COMBINED THAWING TANK AND DUMPING APPARATUS.

Application filed July 2, 1925. Serial No. 41,218.

Our said invention relates to a combined tank and dumping apparatus such as is commonly known as a dip dump and it is an object of the invention to provide convenient means for loosening the ice in a tank or a set of tanks and dumping it out of the cans.

Referring to the accompanying drawings, which are made a part hereof and on which similar reference characters indicate similar parts, Figure 1 is a front elevation partly in section, Figure 2, a transverse section, and Figure 3, a similar section with the parts in a different position.

In the drawings reference character 10 indicates a tank having an over-flow partition 11. The body of the tank is supplied with water which may flow over the top of the partition 11 and thence to the sewer. At opposite ends of the tank it is provided with guides 12 for pins 13 on a vertically movable cage, the bottom of which is indicated at 14 said bottom supporting the ice cans to be dumped. The rail or rear part 15 of the cage is connected to the bottom at right angles thereto and oblique bars 16 hold the parts 14 and 15 in relation to each other.

The cage is moved up and down in the tank by means of a hoist comprising chains 17 connected to an angle iron or bail 18 attached by means of links 19 to the pins 13 movable in the guides or vertical track 12. The rear side of the cage is guided in its up and down movement by a roller 20 and as the cage tilts it is supported and guided at one end by a roller 21 into appropriate position relative to a channel or shoe by which the ice cakes are carried away from the tank.

Detents 22 are supported adjacent to the ends of the tank in position to engage pins 23 fast to the bottom portions 14 of the cage. These detents are pivoted at 24 and have rockarms 25 secured thereto which rockarms are connected by links 26 to treadles 27 pivoted on a rod 28 extending along one side of a tank. In the use of our device the cage is lowered to the position shown in full lines in Figure 2 where the pins come to rest on the hooked parts of the detents 22. While in this position a plurality of full cans which are frozen to the top are placed on the cage. For this purpose the cage and the tank may vary in length to accommodate any number of cans from one to twenty-four or more. The cage is now lowered to the position shown in dotted lines in Figure 2 where it is permitted to remain until the water in the tank has caused the ice to thaw and free itself from the walls of the cans. It will be understood that any excess water in the tank will flow over the partition 11 and thus to the sewer. When the ice has been appropriately loosened the hoist will be operated to lift the cage and permit it to tilt into the position illustrated in Figure 3 whereupon the blocks of ice will slide out into the appropriate channel or channels and will be carried away after which the cage can be returned to the full line position of Figure 2 for another charge. During loading and unloading operations the links 19 and the cross-bar 18 may be swung to the right in Figure 2 into such a position that the crossbar will rest on the ledge on the upright 15 in the position indicated in dotted lines at 18'.

It will be obvious to those skilled in the art that various changes may be made in our device without departing from the spirit of the invention, and therefore we do not limit ourselves to what is shown in the drawings and described in the specification but only as indicated in the appended claims.

Having thus fully described our said invention, what we claim as new and desire to secure by Letters Patent is:

1. The combination of a thawing tank having an outlet, a cage for cans movable up and down in the tank, means adjacent one side of the cage for guiding it in its up and down movement said means permitting the cage to tilt to one side at the upward limit of its movement for dumping the cakes of ice from the cans, and connections whereby the cage may be raised and lowered, said connections being arranged to permit vertical loading of the cans into the cage substantially as set forth.

2. The combination of a thawing tank having an outlet, a cage for cans movable up and down in the tank, means adjacent one side of the cage for guiding it in its up and down movement said means permitting the cage to tilt to one side at the upward limit of its movement for tipping the cans to an empty position, connections whereby the cage may be raised and lowered, said connections permitting unobstructed access to the top of the cage for loading the cans therein, and means for holding the cage in an intermediate position while loading it, substantially as set forth.

3. The combination of a thawing tank having an outlet, a cage for ice cans movable up and down in the tank, means adjacent one side of the cage for guiding it in its up and down movement said means permitting the cage to tilt to one side at the upward limit of its movement for dumping the cakes of ice from the cans, means whereby the cage may be raised and lowered, means for holding the cage in an intermediate position while loading it, and a treadle for releasing said means, substantially as set forth.

4. The combination of a thawing tank, a cage movable up and down in the tank, sets of cans adapted to be removably held in the cage, means adjacent one side of the cage for guiding it in its up and down movement and rollers on the tank permitting the cage to tilt to one side at the upward limit of its movement for tipping the cans, a bail whereby the cage may be raised and lowered, said bail being tiltable to permit removal of the sets of cans and an overflow passage at one side of the tank, substantially as set forth.

5. In a mechanism for immersing and then tilting cans for emptying purposes the combination of a frame for holding the cans, a pivot and rail on the frame, a vertical stationary track for the pivot on said frame, a stationary pivot guide for the rail and a lifting means for said frame arranged to permit vertical loading of said cans into said frame, substantially as set forth.

6. In combination, a tank, a cage in the tank, means on the tank for guiding the cage for up and down movement, means whereby the cage may be lifted including links pivoted centrally on the cage, a crossbar connecting said links, and means at the rear side of the cage for supporting the crossbar during loading and unloading operations, substantially as set forth.

7. The combination of a thawing tank having an outlet, a cage movable up and down in the tank, means adjacent one side of the cage for guiding it in its up and down movement, means whereby the cage may be raised and lowered, and means independent of the lifting means for holding the cage in an intermediate position while loading it, substantially as set forth.

In witness whereof, we have hereunto set our hands at Waynesboro, Pennsylvania this 27th day of June, A. D. nineteen hundred and twenty-five.

LEON BUEHLER, Jr.
NORMAN M. SMALL.